C. Ball,
Stump Elevator.

Nº 45,216.   Patented Nov. 29, 1864.

Witnesses
Wm. J. McNamara
J. P. Hall

Inventor
Courtland Ball
per Munn & Co.
attorneys

UNITED STATES PATENT OFFICE.

CORTLAND BALL, OF AUGUSTA, MICHIGAN.

IMPROVEMENT IN GRUBBING-MACHINES.

Specification forming part of Letters Patent No. 45,216, dated November 29, 1864.

*To all whom it may concern:*

Be it known that I, CORTLAND BALL, of Augusta, in the county of Kalamazoo and State of Michigan, have invented a new and declare that the following is a full, clear, and Improved Grubbing-Machine; and I do hereby exact description thereof, which will enable any person skilled in the art to make and use the same, reference being had to the accompanying drawings, making a part of this specification, in which—

Figure 1:
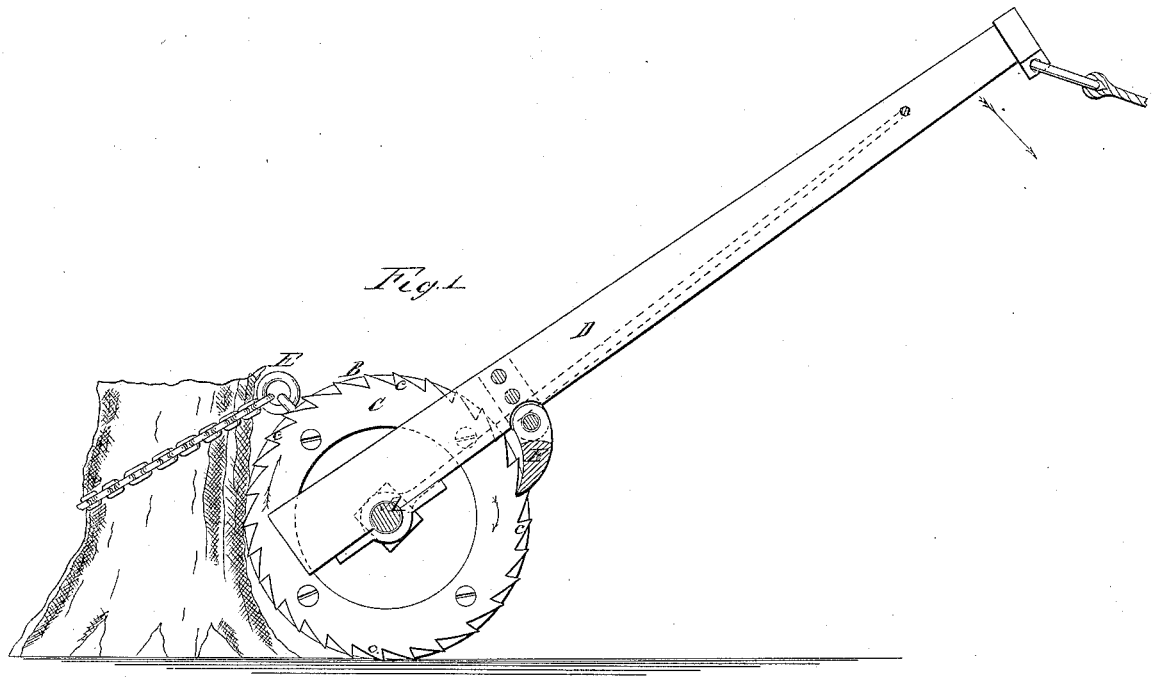
Figure 2:
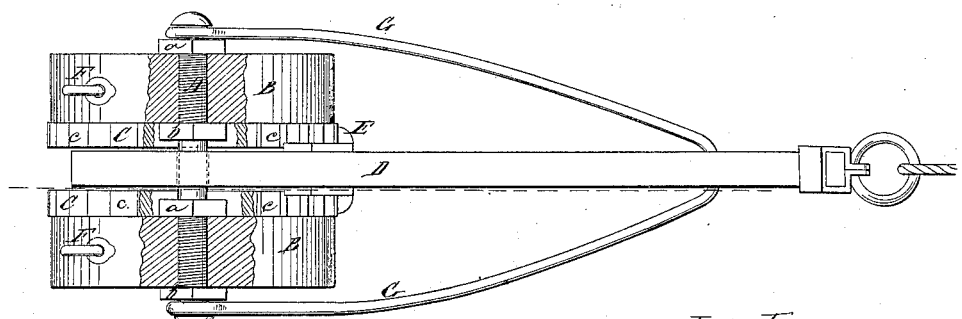

Figure 1 is a side sectional elevation. Fig. 2 is a plan sectional view.

Similar letters of reference indicate like parts.

This invention is intended for use in grubbing or clearing land from tree roots, stumps, stones, &c.

Upon a strong shaft, A, I mount at each end a wheel, B B, made of wood or metal, or of both combined. The wheels B B turn loosely upon the shaft A like ordinary cart-wheels. They are held upon the shaft by nuts *a a* at the ends thereof. The wheels B B are also separated a short distance and kept apart by inner nuts, *b b*, arranged upon shaft A, as shown. The inner face of each wheel is provided with ratchet-teeth *c c*, cut upon the faces of the wheels or cast in metal, in the form of segments or ratchet-rings C C, and bolted to the wheels B B. This latter plan I regard as the best, and have therefore represented it in the drawings.

D is a tongue-lever, attached at its inner end to the shaft A, upon which it swings, as shown.

E is a ratchet-pawl pivoted to the lever D, and so arranged that it will engage with the ratchet-teeth *c* upon the wheels B B, the distance from the axle A, where the lever D is secured to the pawl E, being equivalent to the radius of the circle upon which the teeth *c* are placed. The pawl E will therefore engage the ratchet-teeth in whatever position the lever D may be placed. Upon the periphery of each wheel there are placed one or more eyebolts and rings, F, to which the drawing rope or chain H is to be fastened.

The operation is as follows: The machine is backed up against the stump or other object that is to be lifted, and the ends of the chain, which has been attached to the object, are then fastened into the rings F, the lever D having been thrown up into an elevated position, as indicated in the drawings. Power (either manual or horse) is applied to pull down the outer end of lever D, and, as the pawl E will engage the teeth, the wheels B B will, by the aforesaid application of power, be turned in the direction of the arrow, and the stump or other attached object will be lifted. Each repeated stroke of the lever will of course give more or less movement to the wheels B B and wind pulling the rope or chain upon the periphery thereof.

When the stump or grub has been only partially extracted and it is desired to lift it farther, it is only necessary to raise the lever D and then depress the lever, no rearrangement of the chain upon the stump being necessary.

When the grubs or stumps are small, each of the wheels B B, which are independent, may be attached to a separate grub, and thus two of them may be simultaneously raised.

After the grub has been raised and brought over upon the machine it may be deposited upon a pair of separate rollers or wheels, placed in proper position, and carted away.

My machine may be drawn from place to place by the tongue-lever D, the pawl E being disengaged, so that the wheels B B will roll upon the ground. The lever D is braced laterally by the side braces, G G, one of which extends from each side of the lever D to the end of the axle A, as shown.

The pawl E may, if desired, be divided, so as to form two separate pawls, one for each wheel, thus allowing the movement of the lever and one wheel when necessary, while the other wheel remains at rest. But for ordinary purposes I consider that the use of a single pawl to operate both wheels is best.

I do not claim, broadly, the use of a curved surface and a lever for the winding of the lifting-rope; nor do I claim, broadly, the use of cogged teeth and a lever for the same purpose; but I do claim and desire to secure by Letters Patent—

The combination of the axle A, wheels B B, nuts *a a b b*, toothed rings C C, lever D, suspended pawl E, side braces, G G, the eyebolts F F on the peripheries of the wheels B B, and the chain H, all constructed, arranged, and connected as herein shown and described.

CORTLAND BALL.

Witnesses:
J. W. LANE,
G. B. PHELPS.